W. NOBLE.
PUMP.
APPLICATION FILED JUNE 3, 1919.
1,367,827.
Patented Feb. 8, 1921.
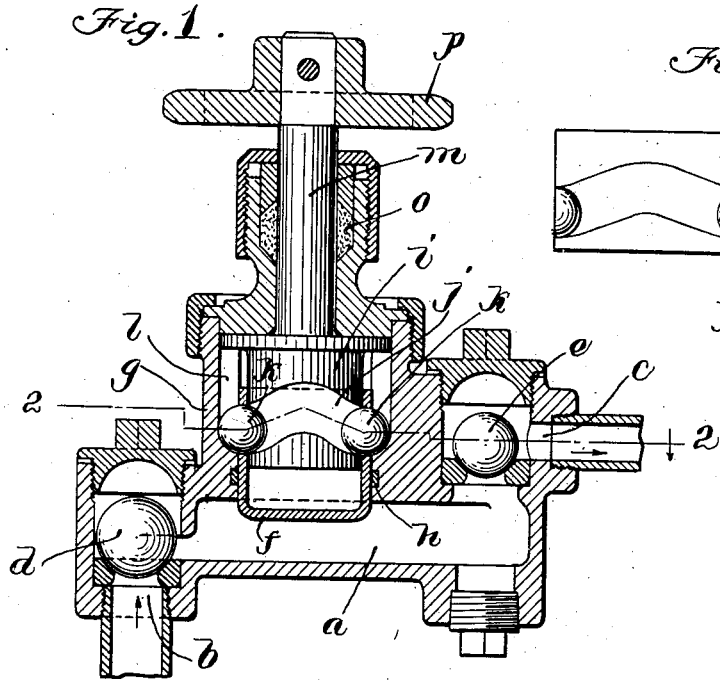
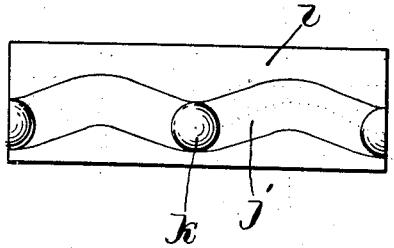
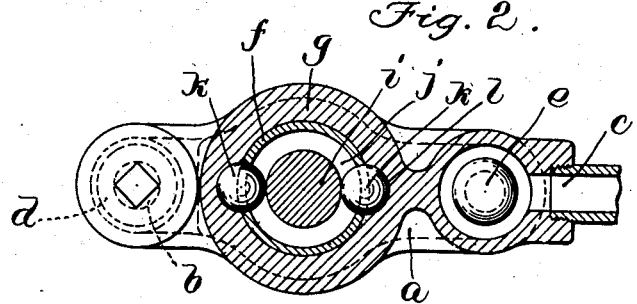
Inventor
Warren Noble
by Wright, Brown, Quinby & Nay
Attorneys

UNITED STATES PATENT OFFICE.

WARREN NOBLE, OF PROVIDENCE, RHODE ISLAND, ASSIGNOR TO N. C. L. ENGINEERING CORPORATION, OF PROVIDENCE, RHODE ISLAND, A CORPORATION OF NEW YORK.

PUMP.

1,367,827.     Specification of Letters Patent.     Patented Feb. 8, 1921.

Application filed June 3, 1919. Serial No. 301,529.

*To all whom it may concern:*

Be it known that I, WARREN NOBLE, a subject of the King of Great Britain, residing at Providence, in the county of Providence and State of Rhode Island, have invented new and useful Improvements in Pumps, of which the following is a specification.

It is the purpose of the present invention to provide a pump having reciprocating parts which are few in number and light in weight, and a rotating driver which may be continuously rotated in the same direction; operatively combined in a small space. I have accomplished this purpose by providing as the only reciprocating parts a light plunger, which is preferably made of pressed sheet metal, and a small number of "cam riders," which may be balls of small mass; and by arranging the rotating driver with its axis in the line of travel of the plunger, the driver and plunger in part overlapping one another. Thus the momentum of the reciprocating parts is very small and the power necessary to reverse them at the ends of their strokes is correspondingly small, and the pump is very compact; wherefore the entire pump structure may be made light in weight and operated with high mechanical efficiency.

I have shown in the drawings an operative embodiment of my invention for the purpose of illustrating the principles of such invention, but without intent to indicate any limitation in the field of application of such invention or in the scope of protection which I claim therefor.

In said drawings,

Figure 1 is a longitudinal section of the pump referred to. Fig. 2 is a cross section on line 2—2 of Fig. 1 and Fig. 3 is a diagram showing a development of the cam by which the pump plunger is directly driven.

Describing now the specific embodiment of the invention shown in the aforesaid drawings $a$ represents the pump body or chamber having an inlet $b$ and outlet $c$ controlled by check valves $d$ and $e$, respectively. A simple form of gravity operated ball valve is shown as typical of any check valves which may be used, it being understood of course that I may employ any suitable devices heretofore used or which may be developed for this purpose.

$f$ is the pump plunger which is mounted in a branch $g$ at one side of the pump structure, the end of the plunger being adapted to enter and withdraw from the pump chamber, thus alternately diminishing and enlarging the effective internal volume thereof. This plunger is preferably made as a cup drawn from sheet metal, and is so shown here. Thereby it may be made light in weight, accurate as to external form and dimensions, sufficiently strong and tough, homogeneous, and free from cracks or other openings through which fluids may leak; while this mode of manufacture enables the plungers to be produced rapidly in large numbers and at very small expense. I do not limit my claim for the combined pump, however, to one in which the plunger necessarily has the characteristics of a drawn sheet metal cup, for a plunger operative in such combination may be made in other ways, obvious to those skilled in the art. However made, the plunger should have a hollow interior with an entrance opening thereto at the outer end for receiving the driving head, or at least with one or more extensions beside such head, side walls which are preferably cylindrical to guide it in the passage or opening to which it is fitted and to enable it to be packed where necessary in a leakage tight manner, and a transverse wall which need not be at the extreme inner end, but may be set back from that end should any need arise for so locating it. Means for packing the plunger is indicated at $h$ in the form of a ring surrounding the plunger and set into a groove in the guiding walls of the pump casing.

The plunger is reciprocated by means of a cam $i$ of a head, herein made as the cylindrical type which projects into the interior of the plunger through the open end thereof and is formed with an encircling cam groove. Rotation of the cam is transformed into reciprocation of the plunger through the agency of cam riders $k$ here shown as being two balls which occupy holes in the walls of the cup and are contained partly in the cam groove $j$ and partly in guiding runways $l$ in the sides of the cylinder $g$ of the pump structure. These runways or guides are here shown as parallel to the axis of the cup, and in any event are transverse to the cam groove, whereby they constrain the riders to travel in prescribed paths and to be propelled back and forth in said paths by the cam groove.

The groove is a continuous undulating curve, as indicated in elevation by Fig. 1, and better in development by Fig. 3. Where two cam riders are used, all the characteristics of the groove are duplicated at diametrically opposite points; while if there were more than two riders the cam offsets would necessarily have to be increased in proportion and to be arranged with equal spacing. A single rider might be used, in which case the inclination angles of the cam offsets would be smaller than is necessary to get equal displacement with a double or multiple cam, but the double arrangement is preferred on account of the better distribution of force upon the plunger thereby accomplished.

As here shown the cam is provided with a stem $m$ passing through a stuffing box $o$ which is mounted on the pump casing, and this stem is equipped with any suitable means by which power may be applied to it, one form of such means being here shown as consisting of a sprocket wheel $p$.

It will be readily appreciated that when power is applied to rotate the cam $i$, the undulating groove $j$ thereof causes the riders to roll back and forth in the runways $l$ and thereby to move the plunger alternately back and forth with pumping effect. This affords a very simple and efficient means of converting rotary motion into reciprocating motion, and is so simple that it can be made in a great number of sizes and applied to a great many specifically different uses at small expense; while the small number of reciprocating parts and the small weight of those parts, enable the pump to be run at very high speed with relatively small expenditure of energy, and enable the stationary parts which guide and support the moving parts to be made with minimum weight.

The cam riders are provided in the form of balls in order that they may roll in their runways and in the cam groove and thus work with the least possible frictional resistance. I am not limited, however, to balls or other rollers for such cam riders, but may use sliding members as well. Neither is my protection limited to any specific form or arrangement of plunger with respect to the pump chamber. The invention contemplates, and the plunger here shown typifies, any and all sorts of pistons and equivalent reciprocating parts which may be applied and arranged in any manner whatever in a pump cylinder or chamber of any sort for enlarging and reducing the internal volume of the pump chamber. Essentially, in the construction represented herein, the branch $g$ is a pump cylinder and the plunger $f$ is a piston fitting and reciprocating in said cylinder; the chamber $a$ being the clearance space at the head of the cylinder. The relative proportions of such cylinder and clearance space may evidently be greatly varied without changing the essential character of the pump as thus analyzed.

What I claim and desire to secure by Letters Patent is:

1. In a pump a chamber, a plunger having an internal cavity working in said chamber, a cam member having a cam groove rotating in said cavity, and a cam rider seated in the wall of the plunger and projecting into said cam groove, the chamber having a guideway in which also the rider is partly contained, whereby the rider is constrained to travel in a given path, in which it is moved back and forth by the cam groove, correspondingly moving the piston.

2. In a pump a reciprocatable plunger having a cylindrical annular wall, a rotatable cam surrounded by said wall and having an encircling axially offset cam groove, a cam rider seated in said groove and projecting through the said wall of the plunger, and a wall forming part of the pump structure surrounding the plunger and having a runway into which the cam rider projects, arranged to compel the latter to move back and forth under the impulsion of the cam.

3. In a pump a plunger formed as a drawn sheet metal cup having a cross web and one or more holes in its sides.

4. In a pump a plunger formed as a sheet metal cup having a cross web and one or more holes in its sides, a cam occupying the interior of the plunger and means occupying said hole actuated by said cam for causing reciprocative movement of the plunger.

5. A pump comprising a cylinder, a piston fitting and reciprocating in said cylinder and made as a drawn sheet metal cup having its open end directed away from the head of the cylinder, a cam contained within the cup piston rotatable about the axis of the latter and having an axially offset cam element, a cam rider engaged with said cam element and contained in the side of the piston, and guiding means in the cylinder constraining the cam rider to move axially; the cam having an external element for receiving rotational motion.

6. A pump comprising a cylinder, a recessed piston mounted to reciprocate therein, a rotatable driving cam occupying the interior of said recessed piston, and a rider engaging the said cam and piston, and being guided to move in the general directions of the reciprocating movement of the piston.

7. A pump comprising a cylinder, a recessed piston mounted to reciprocate therein, a rotatable driving cam, the rotational axis of which substantially coincides with the path in which a part of the piston reciprocates, occupying the interior of said recessed piston, and a rider engaging the said cam and piston, and being guided to move in the general directions of the reciprocating movement of the piston.

8. A pump comprising a cylinder, a plunger reciprocatable in said cylinder, a rotatable driving head coaxial with the cylinder, said piston having an extension lying between the driving head and cylinder wall and provided with an aperture, and a cam rider occupying said aperture and projecting to both sides from the piston extension; one of the parts constituted by the cylinder wall and driving head having an encircling undulating cam element with which said rider is engaged, and the other of said parts having a guiding element transverse to said cam element, with which also the cam rider is engaged.

In testimony whereof I have affixed my signature.

WARREN NOBLE